June 3, 1930.  G. M. McGINNIS  1,761,483
FOOD PRESERVER
Filed Feb. 4, 1929
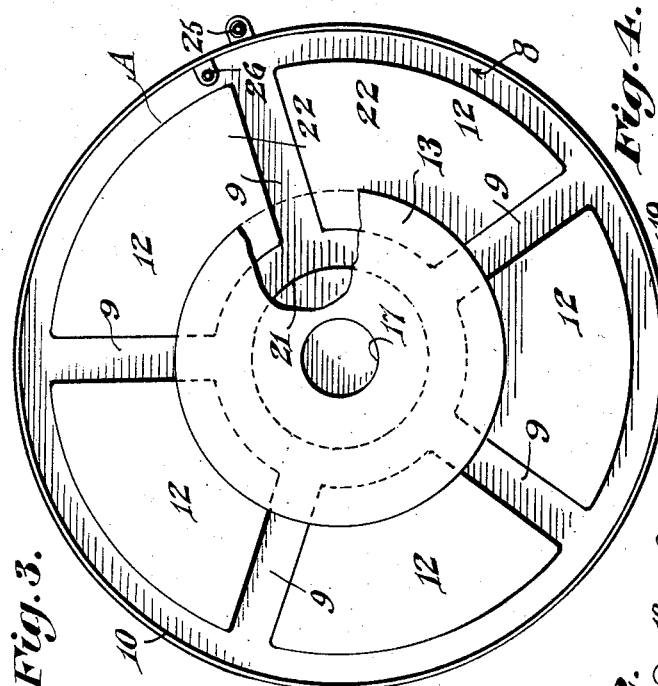
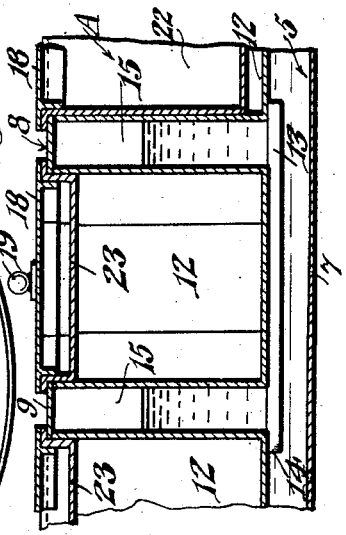
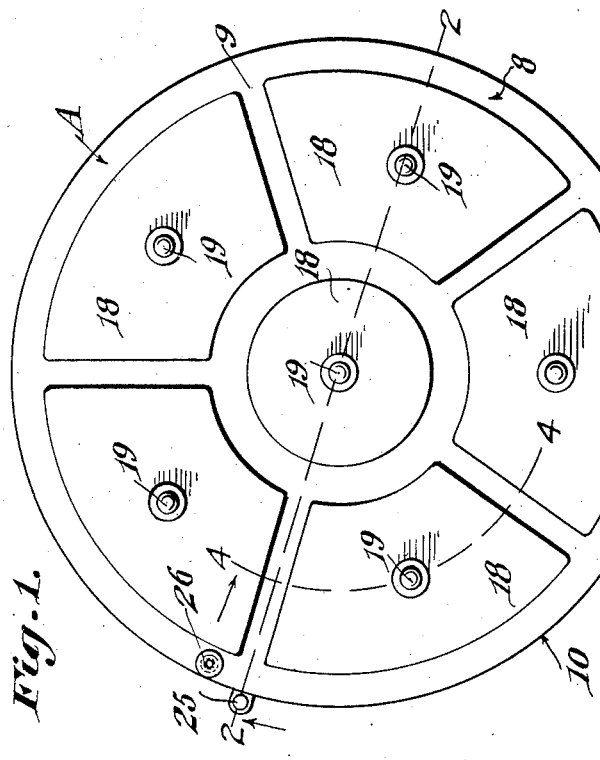
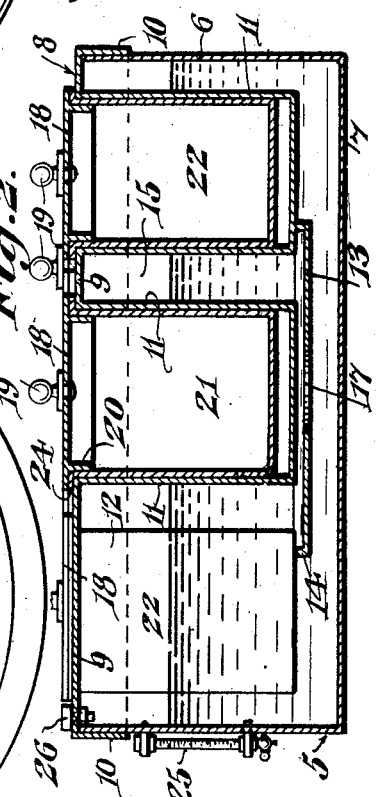
INVENTOR.
G. M. McGinnis,
BY
ATTORNEY Patented June 3, 1930

1,761,483

UNITED STATES PATENT OFFICE

GEORGE MARTIN McGINNIS, OF ROME, GEORGIA

FOOD PRESERVER

Application filed February 4, 1929. Serial No. 337,504.

This invention appertains to devices for preserving prepared foods and has for one of its primary objects to provide a device for keeping prepared foods in either a warm or a cold condition, as may be desired, the device being self contained and capable of being made in various sizes to permit the same to be used for hotel or restaurant use or for home purposes.

Another important object of my invention is to provide a portable self contained device for keeping prepared foods either in a hot or a cold condition as may be desired, embodying a body portion forming a tank for the reception of hot water, if the food is to be kept warm, or ice and water if the food is to be kept cold, with a tight fitting cover for said body embodying a plurality of struck-in cells depending from the top into the water for receiving suitable vessels or containers for the food.

A further object of the invention is the provision of novel means for bracing the inner ends of the cells and for securing the proper distribution of the water around the sides and bottoms of the cells.

A further salient feature of the invention is the provision of novel means for constructing the cells so as to effectively utilize all available space and to permit the device to accommodate a number of different kinds of food stuffs.

A still further object of the invention is the provision of novel means for keeping foods either in a hot or cold condition, as may be desired, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:

Figure 1 is a top plan view of the improved device constructed in accordance with my invention;

Figure 2 is a diametric section through the same taken on the line 2—2 of Figure 1 looking in the direction of the arrows;

Figure 3 is a bottom plan view of the cover removed from the body showing the cells carried thereby and the bottom brace for the cells, the brace being partly broken away, and Figure 4 is a fragmentary section taken on the line 4—4 of Figure 1 looking in the direction of the arrows illustrating the association of meat trays with the cells.

Referring to the drawing in detail, wherein similar reference characters designate corresponding parts throughout the several views the letter A generally indicates my improved device, which comprises a main body 5 including a cylindrical side wall 6 and a disc shaped bottom wall 7. This body 5, in my invention, forms a tank, as will be later described.

The upper end of the tank 5 receives a close fitting cover 8 which includes a top wall 9 and a depending annular flange 10 for engagement with the side wall 6. This cover acts as a closure for the tank and in effect seals the tank or body.

The top wall 9 supports a central depending cylindrical cell 11 and a plurality of side cells 12 which are of a substantially truncated triangular configuration in plan. The side cells 12 are arranged about the central cell 11, in an annular row and each one of these side cells forms a substantially sector of a circle. All of the cells 11 and 12 are substantially the same depth and include side and bottom walls and open out through the top wall of the cover 8. These cells can be struck out from the cover or secured thereto in any desired way.

The body 5, the cover 8 and the cells can be made of any desired material, such as aluminum or the like. It is preferred to brace the lower ends of the cells and I provide a disc shaped reinforcing plate 13 which can be provided with an upstanding flange 14 for connection with the side cells 12. It is to be noted that the side cells 12 are spaced from one another and from the central cylindrical cell 11 so as to provide water spaces 15 therebetween. Further the spacing of the brace plate 13 allows the free circulation of water under all of the cells and the center of the brace plate 13 can be provided with a relatively large axial opening 17.

Each of the cells 11 and 12 is provided with an independent cover 18, which covers can be provided with suitable handles 19 for permitting the removal of the covers from the cells. In order to make a snug fit the covers 18 can be provided with depending flanges 20.

If preferred the cells themselves can receive the prepared food, but I prefer to provide however independent food containers 21, 22 and 23 for this purpose, and when the independent food containers are provided the covers 18 can fit snugly within the same and the upper ends of all of the containers can be provided with right angularly extending flanges 24 for engaging the top wall 9 of the main cover 8. The food container 21 is of the same shape as the central cell and is adapted to fit snugly within the same, while the containers 22 are of the same shape as the side cells 12 in order to fit snugly within the same. The containers 23 have the same shape in plan as the side cells 12 but are of an appreciable less depth than the containers 22 and these containers are adapted to receive meat or the like.

It is obvious that the containers 22 and 23 are interchangeable so that any number of each kind of container can be used when desired.

A water gage 25 is provided for the tank or body 5 in order that the amount of water in the tank can be readily seen and the cover 8 can be provided with a pop valve 26 in order to permit the release of steam, beyond a certain pressure from the device.

In use of my improved device, the various kinds of food stuffs are placed within the different containers 21, 22 and 23 after which the covers 18 are associated therewith and the containers are placed within the dry cells. The tank or body 5 can now be filled with boiling water, if the food stuffs are to be kept hot, after which the cover 8 is associated with the upper end of the body. It is obvious that the water will keep the food stuffs in the containers in a warm condition and if desired the device can be placed over a suitable burner or range in order to maintain the water at a predetermined temperature.

If the prepared foods are to be kept in a cool or cold condition, the body or tank 5 is filled with water and ice after which the cover 8 is placed over the same.

From the foregoing description, it can be seen that I have provided a simple, yet efficient, portable means for keeping prepared foods either in a hot or a cold condition, as may be desired.

Changes in details may be made without departing from the spirit or the scope of this invention, but

What I claim as new is:

1. A portable prepared food preserver comprising a water receiving receptacle, a cover for the upper end of the receptacle, a plurality of depending cells carried by the cover and opening out through the upper end thereof, the cells extending into the receptacle and into the water contained therein, the cells being arranged in spaced relation to permit the circulation of water between the same, a brace plate for the lower ends of the cells spaced from the bottoms of the cells and having an upstanding flange secured to the bottoms of said cells, removable food containers for the cells, a cover for each food container, a water gage for the water receptacle, and a pop valve carried by the cover.

2. A portable prepared food preserver comprising a water receptacle including a cylindrical side wall and a disc shaped bottom wall, a removable cover for engaging the upper end of the receptacle including a disc shaped top wall and a depending flange, a central cylindrical depending cell carried by the top wall and opening out through the same, a plurality of depending side cells arranged in annular formation around the center cell and each forming a sector of a circle, all of the cells terminating short of the bottom of the receptacle, removable food containers for the cells, removable covers for the food containers, and a brace plate for the side cells having an axial opening and upstanding flange connected with said side cells.

In testimony whereof I affix my signature.

GEORGE M. McGINNIS.